(12) United States Patent
Park

(10) Patent No.: US 8,078,784 B2
(45) Date of Patent: Dec. 13, 2011

(54) METHOD AND APPARATUS FOR DATA MOVEMENT IN A SYSTEM ON A CHIP

(75) Inventor: Edwin Park, San Diego, CA (US)

(73) Assignee: AirHop Communications, San Diego, CA (US)

( * ) Notice: Subject to any disclaimer, the term of this patent is extended or adjusted under 35 U.S.C. 154(b) by 0 days.

(21) Appl. No.: 12/148,940

(22) Filed: Apr. 23, 2008

(65) Prior Publication Data

US 2009/0271554 A1 Oct. 29, 2009

(51) Int. Cl.
  *G06F 13/00* (2006.01)
(52) U.S. Cl. .......................... 710/305; 710/100
(58) Field of Classification Search .................. 710/100, 710/305
  See application file for complete search history.

(56) References Cited

U.S. PATENT DOCUMENTS

| | | | | |
|---|---|---|---|---|
| 2003/0097510 A1* | 5/2003 | Joseph | ........................... | 710/305 |
| 2005/0180437 A1* | 8/2005 | Twomey | ........................ | 370/401 |
| 2006/0123154 A1* | 6/2006 | George | ........................... | 710/33 |
| 2006/0200606 A1* | 9/2006 | Kang et al. | ..................... | 710/110 |
| 2007/0075734 A1* | 4/2007 | Ramos et al. | ................... | 326/41 |
| 2007/0260791 A1* | 11/2007 | Saen et al. | ..................... | 710/110 |
| 2008/0186321 A1* | 8/2008 | Park et al. | ...................... | 345/573 |
| 2008/0270650 A1* | 10/2008 | Bracamontes Del Toro | . | 710/105 |

\* cited by examiner

*Primary Examiner* — Glenn A Auve
(74) *Attorney, Agent, or Firm* — Henneman & Associates, PLC; Larry E. Henneman, Jr.

(57) ABSTRACT

There is provided a system for comprising a plurality of blocks, each block comprising any hardware element and a plurality of segments for providing interconnection of the plurality of blocks. A segment comprises a connector between multiple blocks and other segments and segments are connected via the ports of blocks or other segments. Communications between blocks is packet based, each packet including at least a destination block. The packet includes at least one of data, packet/message identification and padding. Blocks have an associated address. A block has one or more input ports and one or more output ports. Segments include means for routing packets to destinations. Each block and segment includes properties. Properties include one or more of clocks, bandwidth, bit widths, and latencies. The plurality of segments for multiple packets to be active on different segments. A single segment includes a plurality of ports for multiple packets to be active on different ports of the segment.

54 Claims, 4 Drawing Sheets

METHOD AND APPARATUS FOR DATA MOVEMENT IN A SYSTEM ON A CHIP

FIELD OF THE INVENTION

The present invention relates to methods and apparatuses for a system on a chip (SOC) and is particularly concerned with data movement.

BACKGROUND OF THE INVENTION

Current Systems on a Chip (SOC) have grown more complicated than systems in the past. Systems in the future will have even more complexity than those of today. Complexity grows in many directions:
1) The system attempts to provide more features. In this situation, the number of blocks in the system increases to support the additional features.
2) The system attempts to do more on current metrics. For example, a camera may have more mega-pixels. Another example would be a turbo decoder that is upgraded to have a larger throughput. In this situation, each block either gets more complex or runs faster.
3) The system combines multiple legacy systems. For example, a simple phone has become a mobile phone, a camera, and a music player.

As systems become complex, one notices several trends:
1) There are many blocks that are similar across the system (i.e. multiple Turbo decoders for the different modes). The resulting system has blocks that are similar and exist in several areas of the system. However, due to the architecture, the blocks cannot be reused in the different modes.
2) Processors run faster and get larger to provide the processing power required. The new processors take a larger gate count. Also, the power requirement for the processor increases. Furthermore, as the processor becomes more complicated, the interface requirements become more complicated. With this, the time/cycle required to communicate outside the processor increases as the interface grows more complex.
3) Systems become an amalgam of disparate systems. The interfaces between the disparate systems are ad hoc and inefficient.
4) The power required to run the system increases.
5) Interfaces between each block become more specialized and cannot be reused even though the functions may be similar.

Referring to FIG. 1, there is illustrated in a block diagram a typical System on a Chip design (SOC) 10. SOC typically have:
1) Processor(s)
2) Memory
3) Blocks/Peripherals
4) Busses In the above, the blocks and processors are connected via the interconnect bus. Also, there are many disparate busses. As the number of blocks increase on a bus, the throughput decreases and/or the latency increases since the loading on the bus increases. Bridges are used to split the busses up so that the blocks that can take a larger latency of lower bandwidth can be "moved further away."

In the example in FIG. 1, the processor, the DMA, the graphics accelerator, the on board memory, memory controller, and the 3 bridges are on the main bus. Typically, this is the fastest bus with the highest bandwidth. However, there are too many blocks in the system to put all on the main bus. Therefore, the three bridges provide the bridging services for the other blocks. There is a slow bus that has 3 blocks to support external interfaces. There is another bus to the communication system to talk to Blocks 1 to Block n. Also, there is a legacy system that is connected through the Legacy System Bridge.

There are many examples of busses. Some of the popular busses are APB, AHB, and OCP. One of the hallmarks of the busses is registers and memories are memory mapped.

Also, blocks/peripherals that need to communicate some information, status, or timing to another block uses an ad hoc scheme to communicate. This ad hoc scheme is typically customized for the specific interface and cannot be used for another interface. In FIG. 1, I/F #1 ad I/F #n are the ad hoc interface connecting the blocks so that the blocks can communicate. Also, the interrupts are not shown in FIG. 1.

Referring to FIGS. 2 and 3 there is illustrated an example of an ad hoc interface 20 and its timing diagram 30 of a block (for example. Block #n) in FIG. 1. The ad hoc interface for this example is for a viterbi decoder. The ad hoc interface is specialized for a viterbi decoder. This interface would not work for another block.

Blocks that need to communicate to the processor communicate in one of two ways:
1) The processor polls the blocks continuously.
2) The block interrupts the processor either directly or indirectly and the processor then goes gets the information.

Furthermore, blocks can directly talk to other blocks. Typically, they share a tightly coupled interface (i.e. another specialized interface). Often, the interface has a tight handshake protocol.

Systems and methods disclosed herein provide a method and apparatus for data movement in a system on a chip to obviate or mitigate at least some of the aforementioned disadvantages.

SUMMARY OF THE INVENTION

An object of the present invention is to provide improved method and apparatus for data movement in a system on a chip.

In accordance with an aspect of the present invention there is provided a method of configuring a system on chip comprising of the step of providing a destination of a message/packet at a predetermined time.

In accordance with another aspect of the present invention there is provided a system for comprising a plurality of blocks, each block comprising any hardware element and a plurality of segments for providing interconnection of the plurality of blocks.

In an embodiment of the present invention there is provided a system for comprising a plurality of systems on chip, each system on chip including a plurality of blocks, each block comprising any hardware element and a plurality of segments for providing interconnection of the plurality of blocks, at least two systems on chip connected via a segment that extends outside boundaries of each of the two systems on chip.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 4:
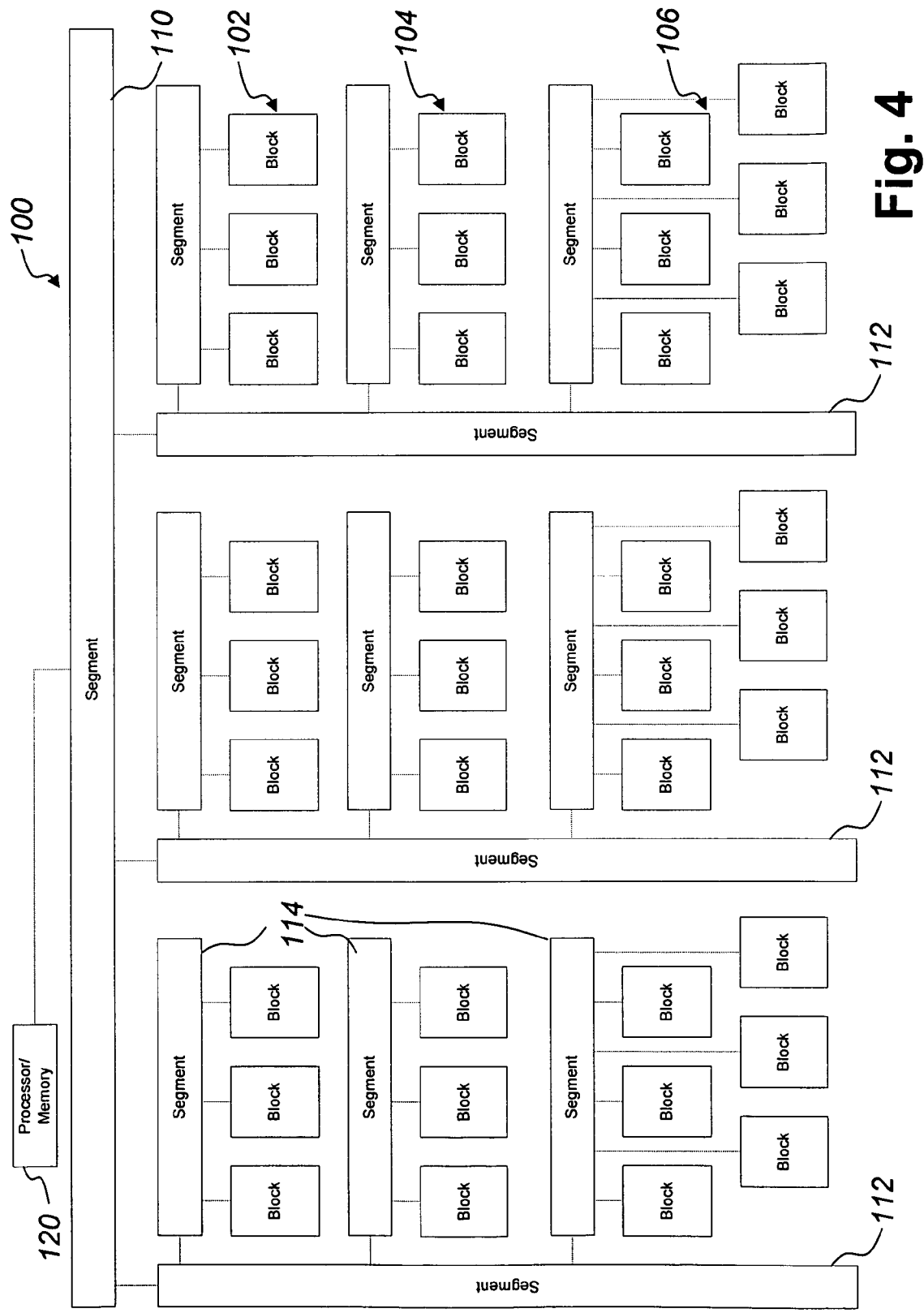
FIG. 4 illustrates a system on chip in accordance with an embodiment of the present invention.

Referring to FIG. 4 there is illustrated a System-on-Chip SOC in accordance with an embodiment of the present invention. The system on chip has different blocks, including processors, that communicate with each other. For example, a system 100 that includes blocks 102, 104, 106 and segments 110, 112, 114 where a block is defined as any hardware element. A block may include one or more processors. A block may be a processor 120, in fact any of the blocks 102, 104 and 106 may be processors. A block has one or more ports. There is no minimum or maximum size of the block. Each block communicates via a unified interface.

The system simplifies the interface of both the processor 120 and the blocks 102, 104, 106 through the unified interface. The concept of the segments that connect the processor(s) and blocks to each other is based upon the unified interface for blocks and the application of a hierarchy of segments to provide for scaleable bandwidth. A processor 120 is treated just as any other blocks. The implementation of the system may, in fact, not include a processor.

Embodiments of the present invention also segment the communication traffic between the blocks and processors (i.e. block-to-block, block-to-processor, processor-to-block, and processor-to-processor).

The segments can scale at different levels of the hierarchy. A segment is the connector between multiple blocks, as shown by segments 114 and other segments as shown by segments 110 and 112. A segment (not shown in FIG. 4) can also join a mix of segments and blocks at the same level of hierarchy. The segments are connected via the ports of the block or other segments. The ports use a common unified interface.

The communication of the blocks is packet based. At a minimum, the packet includes a destination block. The packet may also include data, packet/message identification, padding, etc. Packets are used to carry the message that contains information to be sent from one block to another. A single message may span multiple packets.

The blocks can have one or more associated addresses. For example, providing a block with two separate addresses facilitates the segregation of control and data on two separate ports. In other instances, a block may have multiple ports, but only have 1 address (e.g., when it is desirable to increase the data rate). A block has one or more input ports and one or more output ports. A single port can be both if desired. The number of input and output ports for either block or segment does not have to be the same. A block can also have an input or an output.

In another embodiment, the system on chip has multiple segments where:
  a). A segment is the connector between multiple blocks and/or other segments. The segments are connected via the ports of the blocks and/or other segments.
  b). A segments have the ability to route the packets to the correct destinations.
  c). The routes do not have to be unique.

In another embodiment, the system on a chip includes:
  a). Each of the different blocks and segments having a different (or the same) properties.
  b). Properties include but are not limited to clocks, bandwidth, bit widths, and latencies.
  c). Properties describe block-to-block logical connections do not have to be the same.

In another embodiment, the system on a chip includes
  a). If multiple segments exist, multiple packets can be active on different segments.
  b). On a single segment, multiple packets can be active on different ports of the packet.

In another embodiment, we claim that one realization of the above claim (any or all) where
  a). Multiple messages/packets can exist on block-to-block communications.
  b). Certain block-to-block pairs may or may not communicate though a logical connection can exist.

In another embodiment, the system on a chip includes
  a). The destination of the message/packet is not known to the block until a later time.
  b). The later time include, but not limited to
    i. After fabrication.
    ii After a code update.
    iii. After provisioning.
    iv. After measuring or reading states in the environment.
    v. After a functionality change.

In another embodiment, the system on a chip includes
  a). The data and the address of the block is transmitted on the same interface or
  b). The data and the address of the block is transmitted on a different interface.

In another embodiment, the system includes multiple SOCs wherein each can be connected via a segment that extends outside the boundaries of a SOC.

Figure 1:
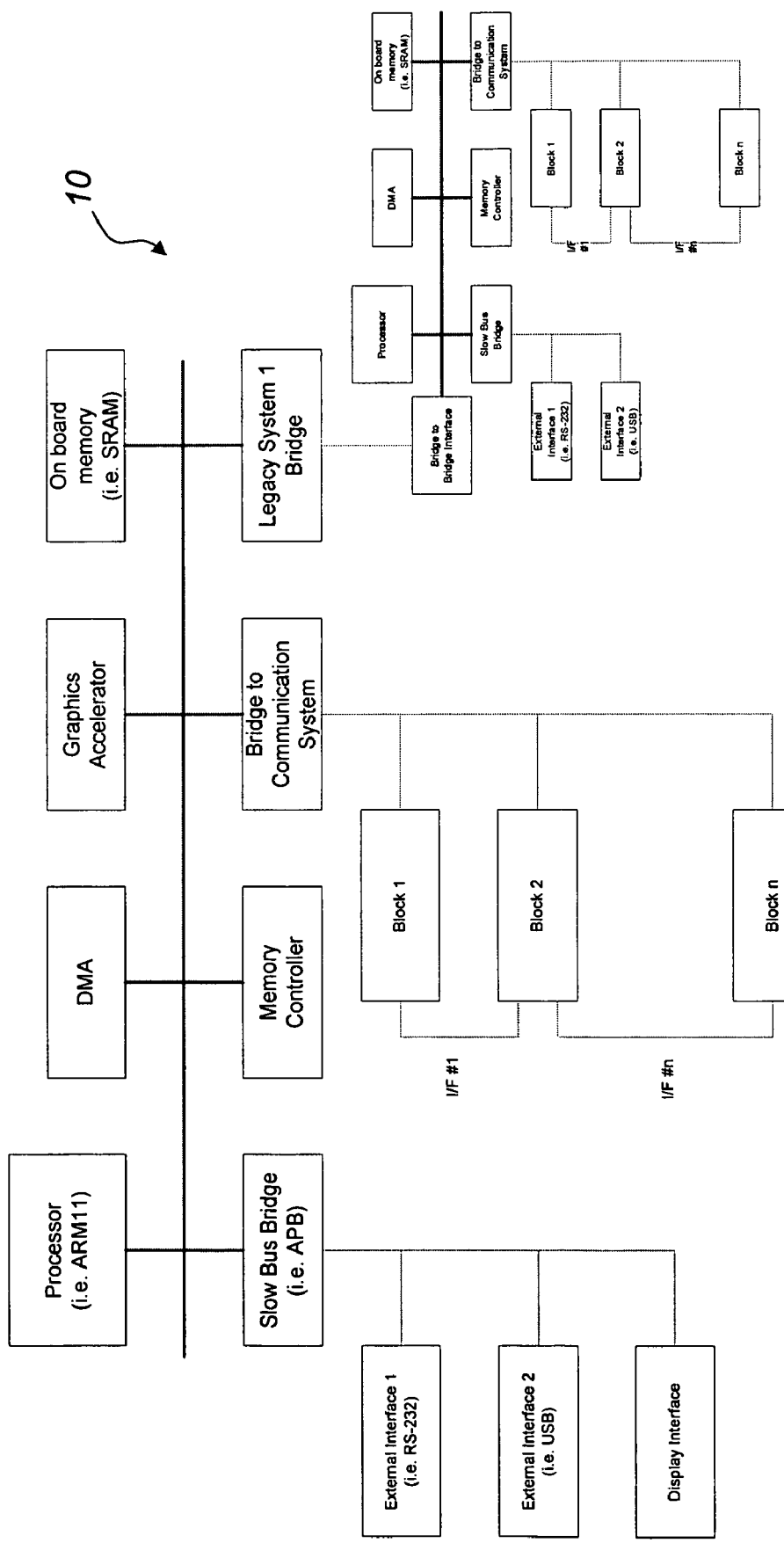
FIG. 1 illustrates in a block diagram a typical System on a Chip design (SOC)
Figure 2:
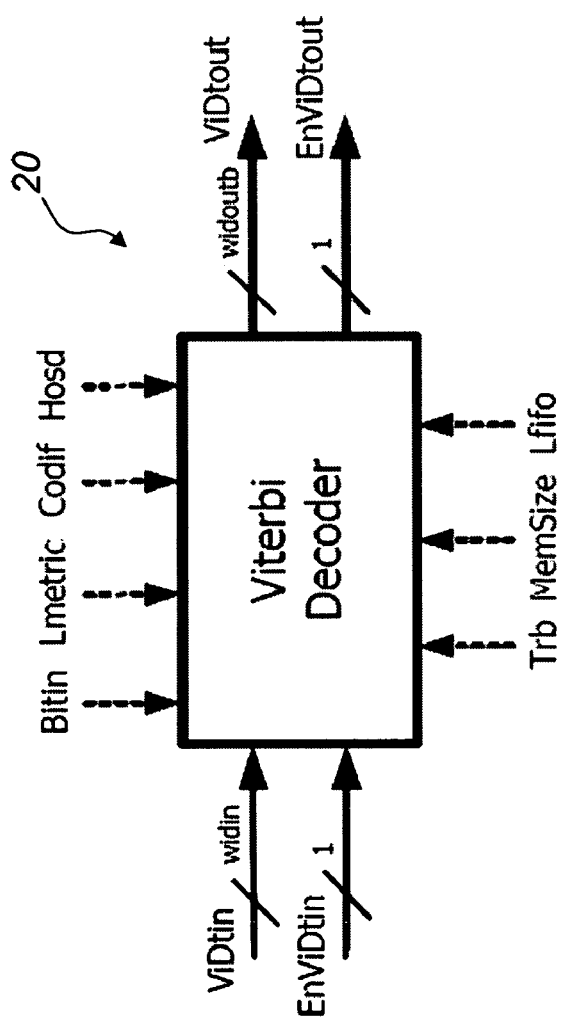
FIG. 2 illustrates an ad hoc interface of a block of FIG. 1.
Figure 3:
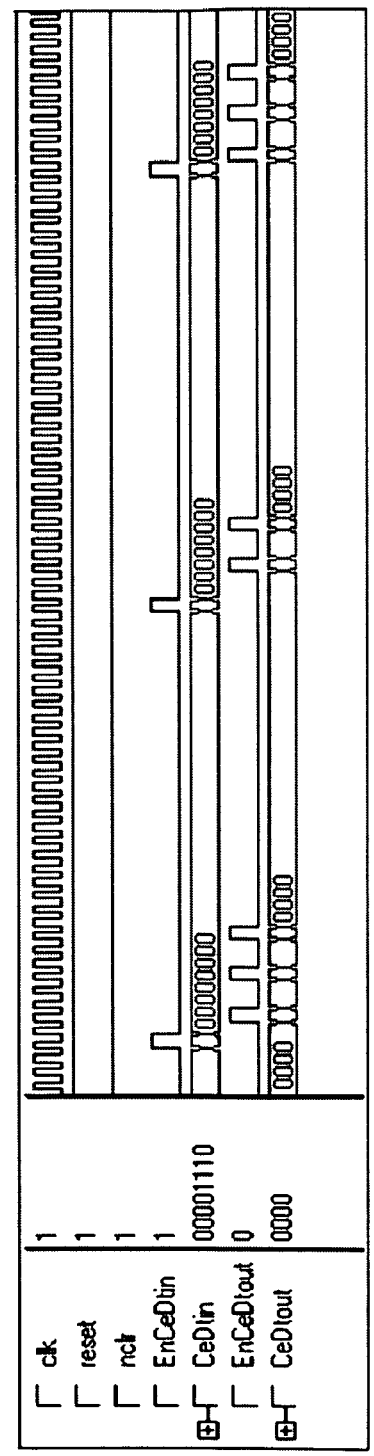
FIG. 3 illustrates in a timing diagram for the ad hoc interface of FIG. 3.
Figure 5:
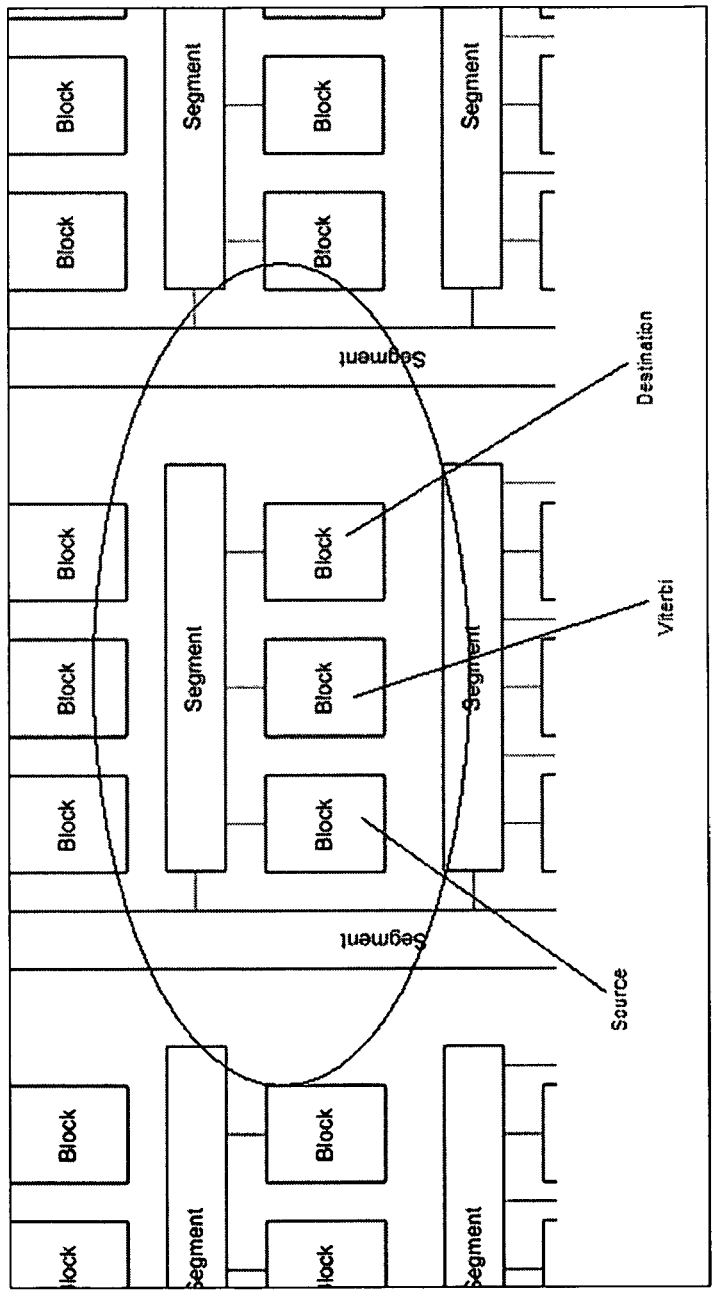
FIG. 5 illustrates how the example of FIG. 2 is implemented in accordance with an embodiment of the present invention.

Referring to FIG. 5, there is illustrated how the example of FIG. 2 is implemented in accordance with an embodiment of the present invention. From the example given in FIG. 2, the following changes are made to the block. The actual computation engine of the viterbi needs no change. In the example, we take a segment where the source of the data for the viterbi is present (i.e. de-interleaver), the viterbi block itself, and the destination of the viterbi's output (i.e. decrypter).

The interface of each of these blocks (including the viterbi) could be identical.

TABLE A

| Block Interface | | |
| --- | --- | --- |
| M_DATA[7:0] | OUT | Data |

Output Data.

| M_ENABLE | OUT | Enable |
| --- | --- | --- |

Signals when M_DATA is valid.

| M_FLUSH | OUT | Flush |
| --- | --- | --- |

Used to flush interface out. Useful at startup.

| M_CLK | IN or OUT | Clock |
| --- | --- | --- |

Clock for the interface. The CLK is an output if the interface is in Source Synchronous Mode. The CLK for the Master and Slave shall be phase and frequency aligned.

| M_BUSY | IN | Busy |
| --- | --- | --- |

Signal used by the Slave to indicate that the interface is busy.

| S_DATA[7:0] | IN | Data |
| --- | --- | --- |

Input Data.

| S_ENABLE | IN | Enable |
| --- | --- | --- |

TABLE A-continued

Signals when S_DATA is valid.

| | | |
|---|---|---|
| S_FLUSH | OUT | Flush |
| Used to flush interface out. | | |
| S_CLK | IN | Clock |
| Clock. Can be the same net as M_CLK. | | |
| S_BUSY | OUT | Busy |
| Signal used by the Slave to indicate that the interface is busy. | | |

The following step demonstrates the data flow. This is a basic that does not demonstrate the full power of running the blocks in parallel.

a) Through its master interface (M_*), the de-interleaver (e.g. source) sends the block (can be broken up into multiple blocks) to be decoded to the decoder on the decoder's slave interface (S_*).
b) Upon receiving the data, the decoder engine starts and decodes the data.
c) When the decoder is finished, the decoder sends the decoded data on its master interface to the slave interface of the decrypter.

A typical problem occurs when after a first generation of a product is produced, the next generation of product needs more features. For example, the new feature is to run the system with twice the amount of data.

Figure 6:
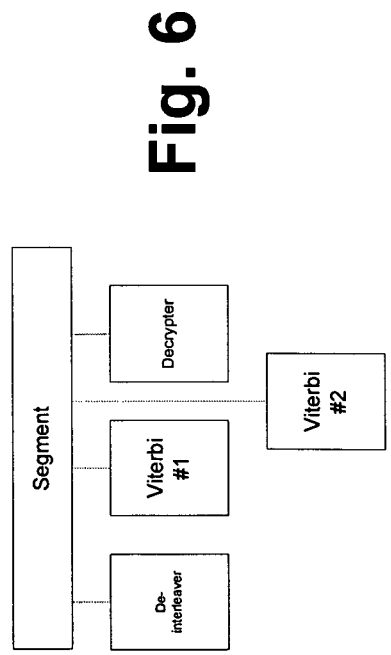
FIG. 6 illustrates how the implementation of FIG. 5 may be updated in accordance with an embodiment of the present invention.

Pre-Data Highway, the entire system would have to be re-architected. However, with the Data Highway, the large problem can be broken down into many smaller problems. In this example, since the de-interleaver and de-crypter are simple enough, they can handle the increase in data rates. However, the decoder cannot. Without a redesign, one can place two decoders and time share the two. Since the interface for the blocks (shown in Table A) is the same, this has minimal (if any effects) on the interleaver or de-crypter, Referring to FIG. 6, there is illustrated how the implementation of FIG. 5 may be updated in accordance with an embodiment of the present invention. The following steps demonstrate the data flow. This is a basic example that does not demonstrate the full power of running the blocks in parallel.

a) Through its master interface (M_*), the de-interleaver (e.g. source) sends the block (can be broken up into multiple blocks) to be decoded to the decoder on the decoder's slave interface (S_*).
b) Upon receiving the data, the decoder engine #1 starts and decodes the data.
c) Meanwhile, the de-interleaver sends its next block to decoder #2. The data is sent via the master interface of the de-interleaver to the slave interface of decoder #2.
d) Upon receiving the data, the decoder engine #2 starts and decodes the data.
e) When the decoder #1 is finished, the decoder sends the decoded data on its master interface to the slave interface of the decrypter.
f) When the decoder #2 is finished, the decoder sends the decoded data on its master interface to the slave interface of the decrypter.

Numerous modifications, variations and adaptations may be made to the particular embodiments described above without departing from the scope patent disclosure, which is defined in the claims.

What is claimed is:

1. A system comprising:
    a plurality of hardware blocks, each said hardware block performing a function and having at least one port for sending or receiving packets; and
    a plurality of segments providing interconnection of the plurality of hardware blocks and operative to route packets between one or more of said hardware blocks and other ones of said segments; and wherein
    each packet includes data to be delivered and identifies at least one destination of said packet, said destination selected from said plurality of hardware blocks and said plurality of segments;
    at least one of said plurality of segments includes a plurality of ports such that multiple packets may be active on different ports of the at least one segment simultaneously; and
    at least some of said plurality of hardware blocks and at least one of said plurality of segments are integrated on a single chip.

2. A system as claimed in claim 1, wherein:
    at least one of said segments connects at least one of a first hardware block and a second hardware block, a first segment and a second segment, and a third hardware block and a third segment; and
    said segments are connected via the ports of blocks or other segments.

3. A system as claimed in claim 1, wherein each of said packets includes at least one of a packet identifier, a message identifier, and padding.

4. A system as claimed in claim 3, wherein each of said plurality of hardware blocks is associated with at least one address.

5. A system as claimed in claim 4, wherein at least one of said plurality of hardware blocks has one or more input ports and one or more output ports.

6. A system as claimed in claim 1, wherein each said block and each said segment includes properties.

7. A system as claimed in claim 6, wherein said properties include one or more of clocks, bandwidth, bit widths, and latencies.

8. A system as claimed in claim 1, wherein the plurality of segments facilitate the routing of multiple ones of said packets simultaneously.

9. A system comprising:
    a plurality of systems on chips, each system on chip including
        a plurality of hardware blocks, each said hardware block performing a function and having at least one port for sending or receiving packets; and
        a plurality of segments providing interconnection of the plurality of hardware blocks, each of said plurality of segments being operative to route packets between destinations; and wherein
    each said packet includes data to be delivered and identifies at least one destination of said packet, said destination selected from at least one of said plurality of hardware blocks and said plurality of segments;
    each said packet includes at least one of a packet identifier, a message identifier, and padding; and
    at least two of said systems on chips are connected via a segment disposed outside boundaries of each of the two systems on chip.

10. A system as claimed in claim 9, wherein:
    at least one of said segments connects at least one of a first hardware block and a second hardware block, a first segment and a second segment, and a third hardware block and a third segment; and
    said segments are connected via the ports of blocks or other segments.

11. A system as claimed in claim 9, wherein at least one of said plurality of hardware blocks is associated with at least one address.

12. A system comprising:
- a first integrated circuitry block including at least one port, said first integrated circuitry block associated with a first address;
- a second integrated circuitry block including at least one port, said second integrated circuitry block associated with a second address; and
- a first segment in communication with said port of said first integrated circuitry block and said port of said second integrated circuitry block, said first segment facilitating intercommunication between said first integrated circuitry block and said second integrated circuitry block by routing packets between said first integrated circuitry block and said second integrated circuitry block based on said first address and said second address, each of said packets including a destination address and data to be delivered to said destination address; and wherein
- said first integrated circuitry block, said second integrated circuitry block, and said first segment are integrated on a chip; and
- said first integrated circuitry block is associated with a plurality of addresses, including said first address.

13. A system according to claim 12, wherein:
- packets routed from said first segment to said first integrated circuitry block identify said first integrated circuitry block by said first address; and
- packets routed from said first segment to said second integrated circuitry block identify said second integrated circuitry block by said second address.

14. A system according to claim 12, wherein:
- said first integrated circuitry block includes a plurality of ports; and
- each of said plurality of ports is associated with a different one of said plurality of addresses associated with said first integrated circuitry block.

15. A system according to claim 12, wherein:
- said first integrated circuitry block includes a plurality of ports; and
- each of said plurality of ports is associated with said first address.

16. A system according to claim 12, wherein said first integrated circuitry block includes at least one input port and at least one output port.

17. A system according to claim 12, wherein said first segment is further operative to communicate with said first integrated circuitry block and said second integrated circuitry block simultaneously.

18. A system according to claim 12, wherein:
- a property of said first integrated circuitry block is different than the same said property of at least one of said second integrated circuitry block and said first segment; and
- said property is selected from the group comprising clock rate, bandwidth, bit width, and latency.

19. A system according to claim 12, wherein said first address and said second address are unique.

20. A system according to claim 12, further comprising:
- a third integrated circuitry block including at least one port, said third integrated circuitry block associated with a third address; and
- a second segment in communication with said port of said third integrated circuitry block and said first segment; and wherein
- said second segment facilitates intercommunication between said third integrated circuitry block and said first segment by routing packets between said third integrated circuitry block and said first segment; and
- said first segment facilitates intercommunication between said first integrated circuitry block, said second integrated circuitry block, and said second segment by routing packets between said first integrated circuitry block, said second integrated circuitry block and said second segment;
- whereby said first segment and said second segment facilitate intercommunication between said first integrated circuitry block, said second integrated circuitry block, and said third integrated circuitry block.

21. A system according to claim 20, wherein said third integrated circuitry block and said second segment are integrated on said chip.

22. A system according to claim 21, further comprising:
- a third segment connected between said first segment and said second segment, said third segment facilitating intercommunication between said first segment and said second segment by routing packets between said first segment and said second segment; and wherein
- said third segment is integrated on said chip.

23. A system according to claim 20, wherein said third integrated circuitry block and said second segment are integrated on a second chip.

24. A system according to claim 23, further comprising:
- a third segment connected between said first segment and said second segment, said third segment facilitating intercommunication between said first segment and said second segment by routing packets between said first segment and said second segment; and wherein
- said third segment is located off said chip and off said second chip.

25. A method for configuring elements integrated on a chip, said method comprising:
- assembling packets including data to be transferred and a destination address;
- providing a first integrated circuitry block integrated on said chip, said first integrated circuitry block including at least one port;
- providing a second integrated circuitry block integrated on said chip, said second integrated circuitry block including at least one port;
- providing a first segment in communication with said port of said first integrated circuitry block and said port of said second integrated circuitry block;
- assigning a first address to said first integrated circuitry block and a second address to said second integrated circuitry block, said first address and said second address indicating respective destinations for ones of said packets having at least one of said first address and said second address as said destination address; and
- assigning a third address to said first segment.

26. A method according to claim 25, wherein said first address and said second address are unique.

27. A method according to claim 25, further comprising:
- providing a third integrated circuitry block including at least one port; and
- providing a second segment in communication with said port of said third integrated circuitry block and said first segment; and
- assigning a fourth address to said third integrated circuitry block, said fourth address indicating a destination for ones of said packets having said fourth address as said destination address.

28. A method according to claim 27, wherein said third integrated circuitry block and said second segment are integrated on said chip.

29. A method according to claim 28, further comprising:
providing a third segment facilitating intercommunication between said first segment and said second segment by routing packets between said first segment and said second segment; and wherein
said third segment is integrated on said chip.

30. A method according to claim 27, wherein said third integrated circuitry block and said second segment are integrated on a second chip.

31. A method according to claim 30, further comprising:
providing a third segment coupled between said first segment and said second segment, said third segment facilitating intercommunication between said first segment and said second segment by routing packets between said first segment and said second segment; and wherein
said third segment is located off said chip and off said second chip.

32. A system comprising:
a first integrated circuitry block including at least one port, said first integrated circuitry block associated with a first address;
a second integrated circuitry block including at least one port, said second integrated circuitry block associated with a second address; and
a first segment in communication with said port of said first integrated circuitry block and said port of said second integrated circuitry block, said first segment facilitating intercommunication between said first integrated circuitry block and said second integrated circuitry block by routing packets between said first integrated circuitry block and said second integrated circuitry block based on said first address and said second address, each of said packets including a destination address and data to be delivered to said destination address; and wherein
said first integrated circuitry block, said second integrated circuitry block, and said first segment are integrated on a chip;
said first integrated circuitry block includes a plurality of ports; and
each of said plurality of ports is associated with said first address.

33. A system according to claim 32, wherein:
packets routed from said first segment to said first integrated circuitry block identify said first integrated circuitry block by said first address; and
packets routed from said first segment to said second integrated circuitry block identify said second integrated circuitry block by said second address.

34. A system according to claim 32, wherein said first integrated circuitry block includes at least one input port and at least one output port.

35. A system according to claim 32, wherein said first segment is further operative to communicate with said first integrated circuitry block and said second integrated circuitry block simultaneously.

36. A system according to claim 32, wherein:
a property of said first integrated circuitry block is different than the same said property of at least one of said second integrated circuitry block and said first segment; and
said property is selected from the group comprising clock rate, bandwidth, bit width, and latency.

37. A system according to claim 32, wherein said first address and said second address are unique.

38. A system according to claim 32, further comprising:
a third integrated circuitry block including at least one port, said third integrated circuitry block associated with a third address; and
a second segment in communication with said port of said third integrated circuitry block and said first segment; and wherein
said second segment facilitates intercommunication between said third integrated circuitry block and said first segment by routing packets between said third integrated circuitry block and said first segment; and
said first segment facilitates intercommunication between said first integrated circuitry block, said second integrated circuitry block, and said second segment by routing packets between said first integrated circuitry block, said second integrated circuitry block and said second segment;
whereby said first segment and said second segment facilitate intercommunication between said first integrated circuitry block, said second integrated circuitry block, and said third integrated circuitry block.

39. A system according to claim 38, wherein said third integrated circuitry block and said second segment are integrated on said chip.

40. A system according to claim 39, further comprising:
a third segment connected between said first segment and said second segment, said third segment facilitating intercommunication between said first segment and said second segment by routing packets between said first segment and said second segment; and wherein
said third segment is integrated on said chip.

41. A system according to claim 38, wherein said third integrated circuitry block and said second segment are integrated on a second chip.

42. A system according to claim 41, further comprising:
a third segment connected between said first segment and said second segment, said third segment facilitating intercommunication between said first segment and said second segment by routing packets between said first segment and said second segment; and wherein
said third segment is located off said chip and off said second chip.

43. A system comprising:
a first integrated circuitry block including at least one port, said first integrated circuitry block associated with a first address;
a second integrated circuitry block including at least one port, said second integrated circuitry block associated with a second address; and
a first segment in communication with said port of said first integrated circuitry block and said port of said second integrated circuitry block, said first segment facilitating intercommunication between said first integrated circuitry block and said second integrated circuitry block by routing packets between said first integrated circuitry block and said second integrated circuitry block based on said first address and said second address, each of said packets including a destination address and data to be delivered to said destination address; and wherein
said first integrated circuitry block, said second integrated circuitry block, and said first segment are integrated on a chip;
a property of said first integrated circuitry block is different than the same said property of at least one of said second integrated circuitry block and said first segment; and
said property is selected from the group comprising clock rate, bandwidth, bit width, and latency.

44. A system according to claim 43, wherein:
packets routed from said first segment to said first integrated circuitry block identify said first integrated circuitry block by said first address; and
packets routed from said first segment to said second integrated circuitry block identify said second integrated circuitry block by said second address.

45. A system according to claim 43, wherein:
said first integrated circuitry block is associated with a plurality of addresses, including said first address;
said first integrated circuitry block includes a plurality of ports; and
each of said plurality of ports is associated with a different one of said plurality of addresses associated with said first integrated circuitry block.

46. A system according to claim 43, wherein:
said first integrated circuitry block includes a plurality of ports; and
each of said plurality of ports is associated with said first address.

47. A system according to claim 43, wherein said first integrated circuitry block includes at least one input port and at least one output port.

48. A system according to claim 43, wherein said first segment is further operative to communicate with said first integrated circuitry block and said second integrated circuitry block simultaneously.

49. A system according to claim 43, wherein said first address and said second address are unique.

50. A system according to claim 43, further comprising:
a third integrated circuitry block including at least one port, said third integrated circuitry block associated with a third address; and
a second segment in communication with said port of said third integrated circuitry block and said first segment; and wherein
said second segment facilitates intercommunication between said third integrated circuitry block and said first segment by routing packets between said third integrated circuitry block and said first segment; and
said first segment facilitates intercommunication between said first integrated circuitry block, said second integrated circuitry block, and said second segment by routing packets between said first integrated circuitry block, said second integrated circuitry block and said second segment;
whereby said first segment and said second segment facilitate intercommunication between said first integrated circuitry block, said second integrated circuitry block, and said third integrated circuitry block.

51. A system according to claim 50, wherein said third integrated circuitry block and said second segment are integrated on said chip.

52. A system according to claim 51, further comprising:
a third segment connected between said first segment and said second segment, said third segment facilitating intercommunication between said first segment and said second segment by routing packets between said first segment and said second segment; and wherein
said third segment is integrated on said chip.

53. A system according to claim 50, wherein said third integrated circuitry block and said second segment are integrated on a second chip.

54. A system according to claim 53, further comprising:
a third segment connected between said first segment and said second segment, said third segment facilitating intercommunication between said first segment and said second segment by routing packets between said first segment and said second segment; and wherein
said third segment is located off said chip and off said second chip.

* * * * *